United States Patent
Mamidwar et al.

(10) Patent No.: US 9,544,665 B2
(45) Date of Patent: Jan. 10, 2017

(54) PROVIDING MULTIPLE ABR STREAMS USING A SINGLE TRANSCODER

(71) Applicant: Broadcom Corporation, Irvine, CA (US)

(72) Inventors: Rajesh Shankarrao Mamidwar, San Diego, CA (US); Wade Keith Wan, Orange, CA (US); Hongtao Zhu, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 540 days.

(21) Appl. No.: 13/933,046

(22) Filed: Jul. 1, 2013

(65) Prior Publication Data

US 2014/0359166 A1    Dec. 4, 2014

Related U.S. Application Data

(60) Provisional application No. 61/830,026, filed on May 31, 2013.

(51) Int. Cl.
*H04N 21/845* (2011.01)
*H04N 21/2343* (2011.01)
(Continued)

(52) U.S. Cl.
CPC ........ *H04N 21/8456* (2013.01); *H04L 65/605* (2013.01); *H04N 21/23439* (2013.01); *H04N 21/472* (2013.01); *H04N 21/6587* (2013.01)

(58) Field of Classification Search
CPC ............ H04L 65/605; H04N 21/23439; H04N 21/472; H04N 21/6587; H04N 21/8456
See application file for complete search history.

(56) References Cited

U.S. PATENT DOCUMENTS

2012/0179834 A1* 7/2012 van der Schaar ............ H04N 21/23439
709/231
2013/0117418 A1* 5/2013 Mutton ............... H04N 21/8456
709/219

(Continued)

OTHER PUBLICATIONS

Thomas Schierl et al, Response to CfP on HTTP Streaming of MPEG Media on Adaptive HTTP Streaming using SVC and MVC, Jul. 2010, ISO/ IEC JTC1/SC29/WG11.*

(Continued)

*Primary Examiner* — Azizul Choudhury
(74) *Attorney, Agent, or Firm* — McDermott Will & Emery LLP (57) ABSTRACT

An device and method for providing multiple adaptive bit rate (ABR) streams using a single transcoder is disclosed. The device receives a group of content segments for a media channel, and converts, using a transcoder, a first of the content segments from a source format to a first data format, a first time duration for converting the first content segment being less than a second time duration for receiving each group of segments. The converted segment is then sent to a client device. On receiving a request from the device for content segments in a second data format, the device performs an initialization of the transcoder to convert content segments from the source format to the second data format, the initialization being completed during a residual period of time, or "operational gap" produced by a difference between the first time duration and the second time duration.

20 Claims, 5 Drawing Sheets

(51) Int. Cl.
*H04N 21/472* (2011.01)
*H04N 21/6587* (2011.01)
*H04L 29/06* (2006.01)

(56) References Cited

U.S. PATENT DOCUMENTS

2014/0208374 A1* 7/2014 Delaunay et al. ............ 725/109
2014/0310424 A1* 10/2014 Andersson et al. .......... 709/231

OTHER PUBLICATIONS

Dominik Kaspar et al, "Using HTTP Pipelining to Improve Progressive Download over Multiple Heterogeneous Interfaces", IEEE ICC 2010 proceedings.*

* cited by examiner

PROVIDING MULTIPLE ABR STREAMS USING A SINGLE TRANSCODER

The present application claims the benefit of priority under 35 U.S.C. §119 from U.S. Provisional Patent Application Ser. No. 61/830,026 entitled "Providing Multiple ABR Streams Using a Single Transcoder," filed on May 31, 2013, the disclosure of which is hereby incorporated by reference in its entirety for all purposes.

BACKGROUND

An adaptive bit rate (ABR) server advertises multiple stream profiles at different bit rates, and uses a separate transcoder for each advertised stream profile. A client may choose a first profile to receive a stream at a first bit rate, but due to network restrictions or processing power later elect to switch to a different profile at a second bit rate. The server will then, beginning with the next segment, use a different transcoder to transcode and provide the stream to the client at the new bit rate. Because live streams are transcoded in real time, latency may be introduced by the change to the new bit rate due to communications with the streaming client, tear down of existing buffers, reallocation of memory, and initiation of the transcoding at the new bit rate. In this regard, the streaming client may include an appropriately sized buffer to accommodate such increases in latency.

BRIEF DESCRIPTION OF THE DRAWINGS

A detailed description will be made with reference to the accompanying drawings.

DETAILED DESCRIPTION

Figure 1:
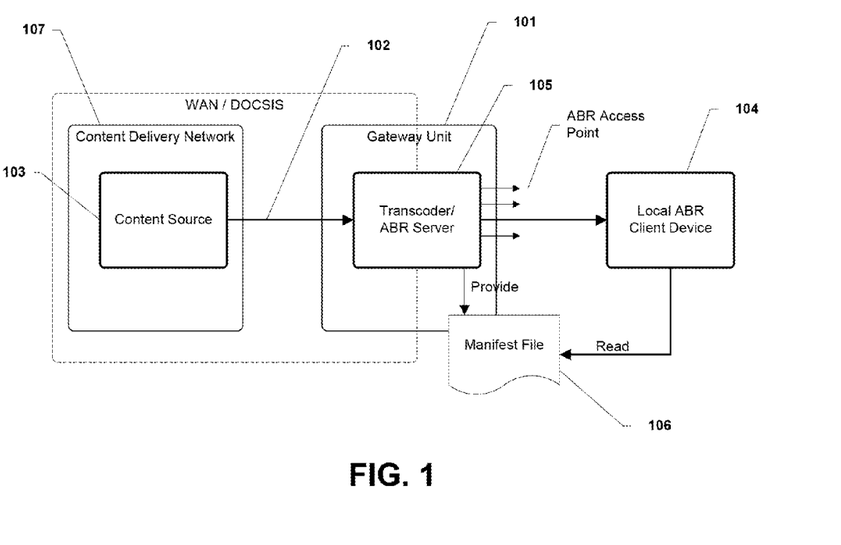
FIG. 1 depicts a component diagram of an example system for providing multiple ABR profiles using a single transcoder.

FIG. 1 depicts a component diagram of an example system for providing multiple ABR profiles using a single transcoder, in accordance with one or more implementations of the subject technology. A gateway unit 101 is configured to receive a content stream 102 (e.g., digital audio or video) from a content source 103, and to provide optimal user-quality ABR-based streaming in addition to traditional digital programming. Gateway unit 101 may be configured, for example, as a cable television set-top-box that receives, processes, and distributes television signals to one or more non-IP enabled viewing devices (e.g., a televisions), and distribute streaming media to one or more locally connected ABR client devices 104.

Gateway unit 101 generally includes a transcoder (e.g., embedded within gateway unit 101) that receives and transcodes content stream 102, and operates as an intermediary for requests from one or more local client devices 104 for live digital content or streaming media received. Local client devices 104 may include, for example, a desktop, laptop, notebook, or tablet computer, smart phone, PDA, a television or other display device having a computer embedded within or attached thereto, or the like. Local client device 104 may be connected to gateway unit 101 via WiFi, Ethernet, Bluetooth, radio frequency, coaxial cable, fiber optic, twisted pair, or other IP-based network infrastructure.

Gateway unit 101 includes a local transcoder and ABR server 105 for the purpose of transcoding and delivering the content of content stream 102 to a locally connected client device 104. Accordingly, content stream 102 is received in a source format provided by content source 103, and advertised to client devices in two or more local data formats determined by ABR server 105. Formats may include, for example, different bit rates, CODECs, compression schemes, transrating or transizing, and the like. ABR server 105 advertises the two or more local data formats for the media channel by way of a manifest file 106. Manifest file 106 includes a stream profile for each stream and a playlist that describes the segments (e.g., the order and length of the segments) available from ABR server 105.

For a given media channel, content stream 102 may be broken up into a group of content segments. Content source 103 may send content stream 102 as multiple segments of data, each of a predetermined length, or content stream 102 may be received into a memory (pre-encoding) buffer and organized into the stream segments by gateway unit 101 on receipt into the memory buffer. In this regard, the memory buffer may store a predetermined amount of data, for example, a predetermined length of data, or a predetermined number of stream segments.

Gateway unit 101 is configured to switch between multiple ABR profiles using a single transcoder. When receiving content segments, gateway unit 101 begins converting the content segments from a source format to one of multiple local data formats. Gateway unit 101 provides the converted segments to locally connected client device 104. A conversion time duration for converting each content segment is less than a receiving time duration for receiving each group of segments. When receiving a request from device 104 for content segments in a new or second data format, gateway unit 101 performs an initialization of a transcoder, including during a residual period of time, or "operational gap" (see FIG. 3) produced by a difference between the conversion time duration and the receiving time duration.

In other words, the transcoding process is faster than the real time stream received from ABR server 105. For example, 10 seconds of an audio/video stream may be transcoded in 9 seconds. If each content segment is 10 seconds then a 1 second "operational" gap is created at gateway unit 101. "Operational gaps" may be used for transcoder initialization and communication between gateway unit 101 and ABR client device 104. The initialization may include preparation activities related to converting content segments from the source format to the new data format. Preparation activities may include, for example, further communication with client, tear-down of existing buffers, and reallocation of memory, and the like. The segments may then be provided to locally connected device 104 in the new format without incurring significant latency resulting from the preparation activities or switching formats.

In one or more aspects, the available ABR profiles provided by gateway unit 101 to a local client device 104 may be limited by the data rate of content stream 102 and the ability of the transcoder to transcode the stream. Network conditions may include available or predicted bandwidth, latency, signal strength, and the like between data source 103 and gateway unit 101, or between gateway unit 101 and local client device 104. For example, local client device 104 may request stream segments at the lowest data rate advertised by gateway unit 101. If local client device 104 finds the download speed for those segments to be greater than the data rate of the segments downloaded, then it may request segments at the next higher data rate. Similarly, if the client finds the download speed is lower than the bit rate for the segments, it may request segments at the next lowest data rate. At the same time, gateway unit 101 utilizes a single transcoder to provide the segments at both the higher or lower data rate to the client device.

Gateway unit 101 may be implemented as, or include, a computing device (e.g., desktop, server, laptop, notebook, tablet computer) or other device connected to a network (e.g., a LAN, WAN, or the Internet). Data source 103 may be located in, or part of a content delivery network (CDN) 107. CDN 107 may be part of a cable TV system having a network infrastructure that utilizes Data Over Cable Service Interface Specification (DOCSIS) to provide high-speed data transfer to gateway unit 101 and other remotely connected devices. In one or more implementations, content source 103 may include a (remote) source ABR server or other multimedia server operably connected to gateway unit 101 over a LAN, WAN, or the Internet. In this regard, content source 103 may provide content for one or more media channels (e.g., television or cable channel, multimedia file, or other audio and/or visual content) in the form of a continuous digital stream or group of content segments (e.g., between two (2) and ten (10) seconds in length).

Figure 2:
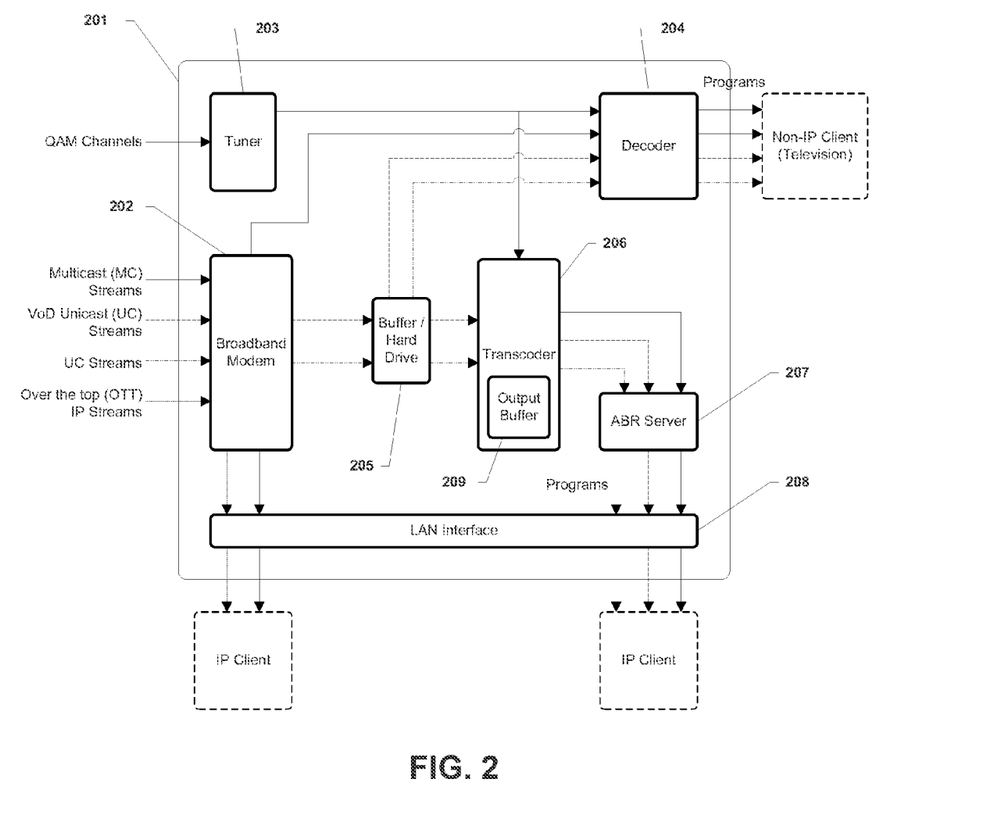
FIG. 2 is a diagram illustrating an example set-top unit for providing multiple ABR profiles using a single transcoder.

FIG. 2 is a diagram illustrating an example set-top unit 201 for providing multiple ABR profiles using a single transcoder, in accordance with one or more implementations of the subject technology. Set-top unit 201 operates as a gateway device, and includes a broadband modem 202 (e.g., a cable modem), a multi-tuner 203 (e.g., a QAM (quadrature amplitude modulation) tuner or ATSC (Advanced Television Systems Committee) tuner), an audio/video decoder 204, a hard drive or memory buffer 205, one or more audio/video transcoders 206, an embedded local ABR server 207, and one or more local area network (LAN) interfaces 208.

Digital channels may be received via QAM by tuner 203 and then decoded by audio/video decoder 204 for broadcast to one or more non-IP client devices (e.g., a television or other display device). Additionally or in the alternative, QAM channels received at tuner 203 may be transcoded by transcoders 206 and converted to IP streams, and then streamed via the LAN interfaces 208. LAN interfaces 208 may include, for example, one or more 802.3 (Ethernet) interfaces, MoCA, one or more 802.11 (wireless) interfaces, or the like.

Broadband modem 202 is configured to receive unicast and multicast IP streams and pass them to decoder 204 or to one or more LAN interfaces 208 for direct streaming to one or more IP client devices. Broadband model 202 may act as a data pipe for transcoder 206, and receive and pass a content stream to transcoder 206. In one or more implementations, a content stream may be received into memory buffer 205 as segments, and the stored segments transcoded by transcoder 206 from memory buffer 205. For example, gateway unit 201 may receive a continuous live stream for a media channel into memory buffer 205, segment a buffered portion of the continuous live stream into a group of content segments, and then transcode the stored segments.

In one or more implementations, buffer 205 may be a hard drive on which a content stream may be stored (e.g., as a file). The content stream may, for example, be received via broadband modem 202 and directly stored to the hard drive for later use. In some aspects, storage of an content stream may be performed simultaneous with delivery of the content stream to a client device via decoder 204, or simultaneous with transcoding of content segments from the hard drive or other buffer 205. A content stream may also be stored as a digital file on the hard drive, and subsequently retrieved from the hard drive using LAN interface 208.

Markers may be inserted into source and transcoded segments of a content stream so that they may be associated with each other during the transcoding process. For example, segments of a content stream may be received into memory buffer 205 and the boundaries of each segment marked and indexed during the buffering process. Upon receiving a request for a different stream profile, set-top unit 201 may stop an ongoing transcoding of a current segment, discard what has been encoded already, identify the segment in memory buffer 205 using a current marker, and begin transcoding the identified segment in the new format. Any latency introduced by the restart of the transcoding process may be reduced or eliminated over time by output buffering, one or more of the previously described "operational gaps," or client-side buffering.

Additionally or in the alternative, when content is stored in buffer 205, and markers are generated, the transcoding process may begin when the client device requests a selected profile of a segment. In this regard, there is no need to discard the transcoded segment. For example, a first segment of ten seconds in length (e.g., at 0-10 seconds) may be stored starting at zero seconds, and the transcoding process started at one second. Because the transcoding of the segment is faster than it is received, the segment will be completed by the tenth second, with an initial "operational gap" of one second in length. The same process may repeat for the next segment (e.g., 10-20 seconds), for example, with the transcoding process of the segment starting at the eleventh second and the "operational gap" occurring between the tenth and eleventh second interval (see FIG. 3).

Additionally or in the alternative, transcoder 206 may include an output buffer 209. The output buffer may be large enough to hold several seconds of content. Upon receiving a request for a different stream profile, set-top unit 201 may stop an ongoing transcoding of a current segment, discard what has been encoded and stored in the output buffer, identify the segment in memory buffer 205 using a current marker, and begin transcoding the identified segment in the new format. The amount of encoded content segments that is discarded from output buffer 209 may depend on how much data in the output buffer must be reserved for maintaining a continuous stream to the client. For example, if transcoder 206 transcodes in one second intervals, output buffer 209 may maintain two or more seconds of data so that at least a one second delay is maintained for re-transcoding of the segments. Additionally or in the alternative, the new format setting may be applied to the identified segment by transcoder 206 starting at a time position excluding what is already in output buffer 209.

ABR server 207 is configured to advertise availability of multiple content streams in different data formats (e.g., via a manifest file) for content received via broadband modem 202. ABR server may, for example, generate a manifest file describing the available streams. Transcoder 206, operating in connection with ABR server 207, is configured to receive and convert source content from a source data format to an advertised data format. As described previously, transcoder 206 is configured to convert a segment of the source content in a period of time that is less than the time duration of the segment, or the period for receiving the segment.

ABR server 207 provides the source content in a first advertised data format to a client device operably connected to LAN interface 208. On receiving a request from the client device to receive the source content in a second advertised data format, ABR server 207 is configured to initiate a conversion of the multimedia data stream from the source data format to the second advertised data format, the initiating, including preparation activities that occur during an operational gap produced by a difference between the time period for converting a respective segment of the multimedia data stream and the time duration of the respective segment. Once the conversion has begun ABR server 207 starts to provide the multimedia data stream to the client device in the second advertised data format.

Figure 3:
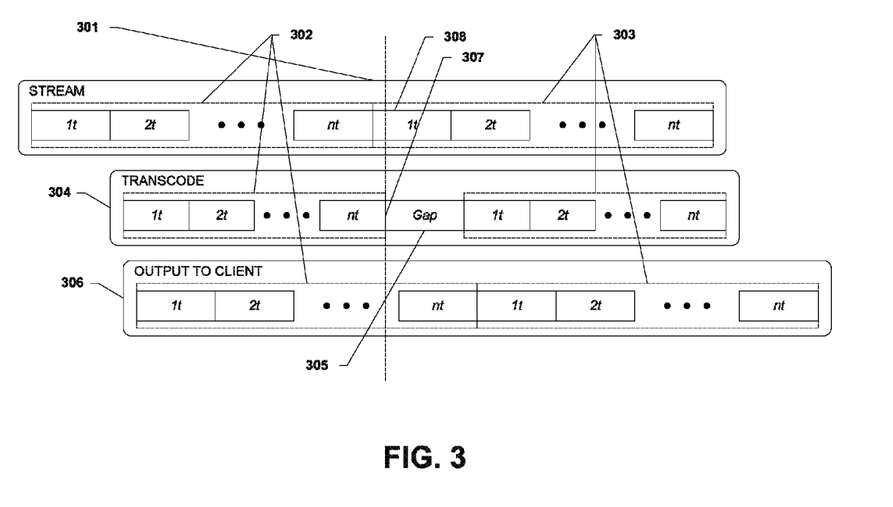
FIG. 3 is a diagram illustrating an example transcoding sequence, including an operational gap for reducing latency when switching between data formats.

FIG. 3 is a diagram illustrating an example transcoding sequence, including an operational gap for reducing latency when switching between data formats, in accordance with one or more implementations of the subject technology. As described previously, gateway unit 101 is configured to convert, or transcode, a received segment of a content stream from the source data format to an advertised format in less time than it takes to receive the segment. In other words, a first time period for converting the segment is less than a second time period for receiving the segment. For example, if the data steam is a live stream, the server may transcode a ten second portion of the stream in nine seconds or less.

FIG. 3 depicts how a single transcoder may transcode a stream 301 of content segments. Stream 301 includes two segments 302 and 303, each having a duration of nt. Stream 301 may have been continuously streamed into a buffer (e.g., memory buffer 205) from a content source and broken up into segments 302 and 303 while in the buffer, or segments 302 and 303 may have been directly received from the content source.

In the depicted example, gateway unit 101 buffers a portion (e.g., one second) of stream 301 as it received, and starts transcoding the stream after the first second at a rate faster than the stream was received. Accordingly, a leading portion (e.g., of duration 1t) of first segment 302 is received into the buffer before transcoding of the segment begins. First segment 302 is transcoded 304 at a speed such that the entire segment is transcoded in the amount of time it takes to receive the remaining portion of the segment (e.g., having a duration of (n−1)t, between 2t and nt).

In this manner, an operational gap 305 is generated during the initial buffering of the leading portion of the currently received segment. Operational gap 305 may be used by gateway unit 101 to perform operational activities related to switching between transcoding formats and communication with the client device. While FIG. 3 depicts operational gap 305 as being concurrent with buffering of the leading portion of a segment, and before the segment is converted from the source format, it is understood that operational gap 305 may be concurrent with receipt of an end or other portion of the segment. If the transcoded segments are ten seconds long then the first second of a ten second segment of a stream may be buffered, and the entire ten second segment is completely transcoded by the time the entire segment is received. An operational gap of one second is created for each ten second segment for communication between the client and the server regarding what the next transcoding bit rate should be.

In the depicted example, second segment 303 is transcoded to a different format than first segment 302. Gateway unit 101 receives a request from client device 104 for the content stream to be transcoded to a second data format. The request may be made during an operational gap, or during an ongoing transcoding of first segment 302. Gateway unit 101 then initiates a conversion of the data stream from the source data format to the second advertised data format. In this regard, gateway unit 101 may initiate a transcoding of second segment 303 (including, for example, further communication with client, tear down of existing buffers, and reallocation of memory) during operational gap 305 (produced by a difference between a first time period for converting first segment 302 and a second time period for receiving each segment). After the transcoding is initiated, second segment 303 is transcoded to the new format and provided to client device 104. Using the foregoing technique, multiple transcoded segments may be output to a client device according to the third stream 306 of FIG. 3 with minimal latency once buffering begins.

Figure 4:
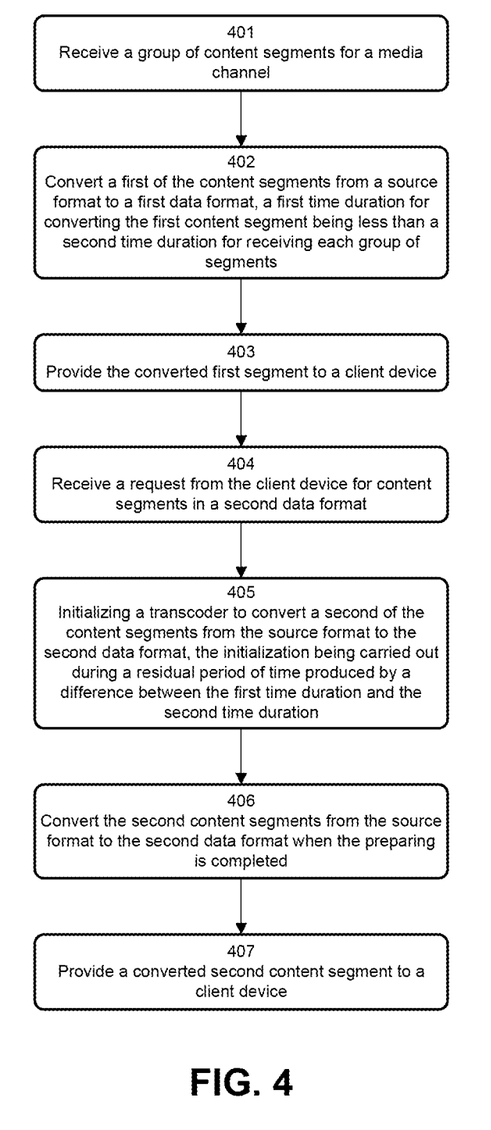
FIG. 4 is a flowchart illustrating an example process for providing multiple ABR profiles using a single transcoder.

FIG. 4 is a flowchart illustrating an example process for providing multiple ABR profiles using a single transcoder, in accordance with one or more implementations of the subject technology. The blocks of FIG. 2 do not need to be performed in the order shown. It is understood that the depicted order is an illustration of one or more example approaches, and are not meant to be limited to the specific order or hierarchy presented. The blocks may be rearranged, and/or two or more of the blocks may be performed simultaneously.

According to one or more implementations, one or more blocks of FIG. 4 may be executed by gateway unit 101, set-top box 201, or other computing device of the subject technology. Similarly, a non-transitory machine-readable medium may include machine-executable instructions thereon that, when executed by a computer or machine, perform the blocks of FIG. 4. Accordingly, the blocks of FIG. 4 may be performed within the context of transcoding a content stream to one of multiple advertised ABR profiles.

According to FIG. 4, a group of content segments for a media channel is received (401). In one or more implementations, the group of content segments may be part of a continuous live stream. The live stream may be received into a data buffer, and a buffered portion of the stream segmented into the group of content segments. In this regard, the group of content segments is received for conversion from the data buffer. Additionally or in the alternative, the stored content segments may be indexed based on the boundaries of each segment so that a segment may be retrieved from the buffer based on a corresponding index.

A first of the content segments is converted (402) from a source format to a first data format, a first time duration for converting the first content segment being less than a second time duration for receiving each group of segments. In one or more implementations, a manifest file for utilization by the client device is generated. The manifest file advertises the media channel in the first data format and a second data format, and includes a segment playlist for the media channel. The segment playlist, for example, describes the order of the group of content segments and/or one or more characteristics (e.g., length) of the segments.

The converted first segment is then provided (403) to a client device. The first segment (and other prior or subsequent segments in the same format) are provided to the client device according to the local format (which may have been previously requested by the client). In this regard, ABR server 207 may receive one or more client HTTP requests from the client device, with each client HTTP being for a respective content segment. For each received client HTTP request, ABR server 208 identifies a content segment by a URL provided in the HTTP request, transcodes the identified segments, and provides the identified segment to the local client device according to the received client HTTP request. As described previously, each of the generated local content segments may be provided to the local client device according to a local playlist for the media channel.

A request is received (404) from the client device for content segments in a second data format (e.g., a different form of data compression or data rate than the currently provided format). The request may be received as a client HTTP request for a subsequent segment in the second data format. In response to the request, gateway unit 101 identifies the requested segment (e.g., in the playlist) and prepares to switch transcoding formats so that the requested segment may be transcoded in the second data format.

When receiving the request for content segments in the second data format, a transcoder is initialized to convert a second of the content segments from the source format to the second data format are performed (405), the initialization being carried out (e.g., completed) during a residual period of time produced by a difference between the first time duration and the second time duration. Accordingly, the residual period of time may occur after the first content segment is converted, and immediately before the conversion of the second content segment begins. With brief reference to FIG. 3, receipt of a leading portion 308 of the second content segment (1t of reference 303 in stream 301) may occur concurrently with a start 307 of a corresponding residual period of time (gap 305) and with providing an end portion of the first content segment (nt of reference 302 in output 306 to the client device. The leading portion of each content segment may also be buffered before being converted from the source format. In other aspects, the residual period of time may occur concurrently with of an end or other portion of the first content segment.

The initialization of the transcoder may include preparation activities including certain steps required to switch between transcoding formats. For example, operational hardware (e.g., a processor embedded within gateway unit 101) may wait until a transcoder is in a ready state, and then instruct the transcoder to switch from converting content segments from the source format to the first data format, to converting content segments from the source format to the second data format. The transcoder may be required to clear existing buffers and/or allocate memory before a stream may be transcoded in the second data format. Moreover, preparation activities may include locating, retrieving, and providing the second of the content segments to the transcoder for conversion of the second segment to the second data format.

Additionally or in the alternative, if the group of content segments are indexed and stored in a data buffer, on receiving a request for content segments in a data format that is different than a currently provided format, preparation activities may include halting an ongoing conversion of a current segment, identifying an index marker for the current segment, discarding a converted portion of the current segment, and retrieving the current segment from among the stored group of content segments based on the identified index marker. The retrieved segment may then be provided to the transcoder to begin converting the retrieved segment to the new format.

The second content segment is converted (406) from the source format to the second data format (e.g., by the transcoder) when the preparing is completed, and the converted second content segment is provided (407) to a client device. One or more client HTTP requests may be received from the client device, each requesting a content segment in the new format. For each received client HTTP request, ABR server 208 identifies the content segment by a URL provided in the HTTP request, transcoder the identified segment to the new format, and provides the identified segment to the local client device according to the received client HTTP request.

Figure 5:
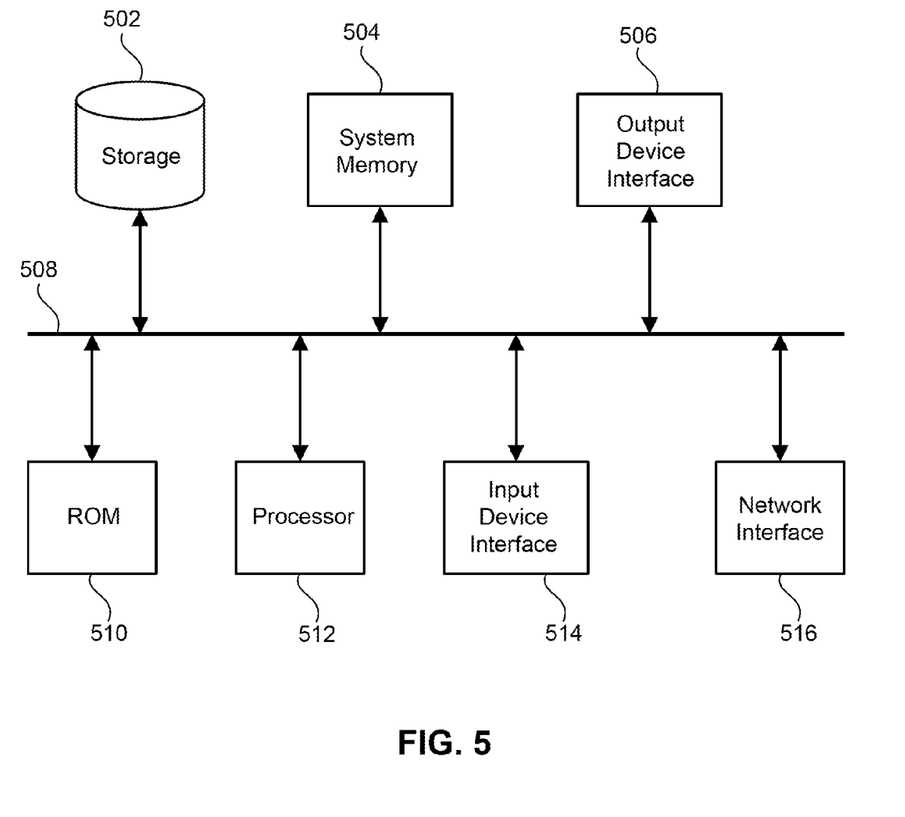
FIG. 5 is a diagram illustrating an example electronic system for use in connection with providing multiple ABR profiles using a single transcoder, including a processor and other related components.

FIG. 5 is a diagram illustrating an example electronic system 500 for use in connection with providing multiple ABR profiles using a single transcoder, including a processor and other related components, in accordance with one or more implementations of the subject technology. Electronic system 500, for example, is representative of the computing hardware embedded within, or for providing functional operation of, the previously described devices, including gateway unit 101, set-top box 201, local client devices 104, and the like. In one or more aspects, electronic system 500 may be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to a user or device can be any form of sensory feedback, such as visual feedback, auditory feedback, or tactile feedback; and input from the user or device can be received in any form, including acoustic, speech, or tactile input.

As shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for providing multiple adaptive bit rate (ABR) profiles for a content stream using a single transcoder, comprising:
    receiving a group of content segments for a media channel;
    converting, by a transcoder device, a first content segment of the group of content segments from a source format to a first data format, a first time duration for converting the first content segment being less than a second time duration for receiving each content segment in the group of content segments;
    providing the converted first content segment to a client device;
    in response to receiving a request for content segments in a second data format, initializing the transcoder device to convert a second content segment of the group of content segments from the source format to the second data format, the initializing being completed during a residual period of time produced by a difference between the first time duration and the second time duration; and
    providing a converted second content segment to the client device.

2. The method of claim 1, wherein initializing the transcoder device comprises:
    waiting until the transcoder device is in a ready state;
    instructing the transcoder device to switch from converting content segments from the source format to the first data format, to converting content segments from the source format to the second data format; and
    providing the second content segment of the group of content segments to the transcoder device for conversion of the second content segment to the second data format.

3. The method of claim 1, wherein the residual period of time occurs after the first content segment is converted, and immediately before the conversion of the second content segment begins.

4. The method of claim 3, wherein receipt of a leading portion of the second content segment occurs concurrently with a corresponding residual period of time and with providing an end portion of the first content segment to the client device.

5. The method of claim 4, wherein a leading portion of each content segment is buffered before being converted from the source format.

6. The method of claim 3, wherein the residual period of time occurs concurrently with receipt of an end portion of the first content segment.

7. The method of claim 1, further comprising:
    generating a manifest file for utilization by the client device, the manifest file advertising the media channel in the first data format and the second data format, and including a segment playlist associated with the group of content segments for the media channel.

8. The method of claim 1, further comprising:
receiving a continuous live stream for the media channel into a data buffer; and
segmenting a buffered portion of the continuous live stream into the group of content segments, and
wherein the group of content segments is received for conversion from the data buffer.

9. The method of claim 1, wherein the first data format and the second data format each comprise a different form of data compression or bit rate.

10. The method of claim 1, further comprising:
storing the group of content segments in a data buffer;
indexing the stored content segments based on boundaries of the stored content segments; and
in response to receiving a request for content segments in a data format that is different than a currently provided format:
halting an ongoing conversion of a current segment;
identifying an index marker for the current segment;
discarding a converted portion of the current segment;
retrieving the current segment from among the stored group of content segments based on the identified index marker; and
begin converting the retrieved segment to the second format.

11. A system for providing multiple adaptive bit rate (ABR) profiles for a content stream using a single transcoder, comprising:
a transcoder;
at least one processor circuit configured to:
receive a group of content segments for a media channel;
convert, using the transcoder, a first content segment of the group of content segments from a source format to a first data format, a first time duration for converting the first content segment being less than a second time duration for receiving each content segment of the group of content segments;
provide the converted first content segment to a client device;
in response to receiving a request for content segments in a second data format, initialize the transcoder to convert a second content segment of the group of content segments from the source format to the second data format, the initialization being carried out during a residual period of time produced by a difference between the first time duration and the second time duration; and
provide the second content segment to the client device in the second data format.

12. The system of claim 11, wherein the initialization of the transcoder comprises:
waiting until the transcoder is in a ready state;
instructing the transcoder to switch from converting content segments from the source format to the first data format, to converting content segments from the source format to the second data format; and
providing the second content segment of the group of content segments to the transcoder for conversion of the second content segment to the second data format.

13. The system of claim 11, wherein the residual period of time occurs after the first content segment is converted, and immediately before the conversion of the second content segment begins.

14. The system of claim 13, wherein receipt of a leading portion of the second content segment occurs concurrently with a corresponding residual period of time and with providing an end portion of the first content segment to the client device.

15. The system of claim 14, wherein a leading portion of each content segment is buffered before being converted from the source format.

16. The system of claim 13, wherein the residual period of time occurs concurrently with receipt of an end portion of the first content segment.

17. The system of claim 11, wherein the at least one processor circuit is further configured to:
receive a continuous live stream for the media channel; and
segment a buffered portion of the continuous live stream into the group of content segments,
wherein the group of content segments is received for conversion from a memory buffer.

18. The system of claim 11, wherein the first data format and the second data format each comprise a different form of data compression or bit rate.

19. The system of claim 11, wherein the at least one processor circuit is further configured to:
store the group of content segments in a memory buffer;
index the stored content segments based on boundaries of the stored content segments; and
in response to receiving a request for content segments in a data format that is different than a currently provided format:
halt an ongoing conversion of a current segment by the transcoder;
identify an index marker for the current segment;
discard a converted portion of the current segment;
retrieve the current segment from among the stored group of content segments based on the identified index marker; and
provide the retrieved segment to the transcoder for conversion of the retrieved segment to the second format.

20. A device for providing multiple adaptive bit rate (ABR) profiles for a content stream using a single transcoder, the device configured to:
advertise availability of a multimedia data stream in two or more predetermined data formats;
receive the multimedia data stream in a source data format from a stream source, the multimedia data stream comprising one or more segments each of a time duration;
convert the multimedia data stream from the source data format to a first advertised data format, a time period for converting a segment of the multimedia data stream being less than the time duration of the segment;
provide the multimedia data stream to a streaming client in the first advertised data format;
receive a request from the streaming client to receive the multimedia data stream in a second advertised data format;
initiate preparation activities related to a conversion of the multimedia data stream from the source data format to the second advertised data format, the preparation activities occurring during a residual period of time produced by a difference between the time period for converting a respective segment of the multimedia data stream and the time duration of the respective segment; and provide the multimedia data stream to the streaming client in the second advertised data format.

* * * * *